United States Patent

Masaki et al.

[11] Patent Number: 5,486,731
[45] Date of Patent: Jan. 23, 1996

[54] SINUSOIDALLY DISTRIBUTED WINDING METHOD SUITABLE FOR A DETECTOR WINDING

[75] Inventors: Koichi Masaki; Yoshinao Fukuzawa; Kanji Kitazawa; Takanobu Azuma; Naohiro Naganuma; Tetsuo Hosoda, all Iida, Japan

[73] Assignee: Tamagawa Seiki Kabushiki Kaisha, Tokyo, Japan

[21] Appl. No.: 38,463

[22] Filed: Mar. 29, 1993

[30] Foreign Application Priority Data

Oct. 27, 1992 [JP] Japan .................................. 4-288798

[51] Int. Cl.⁶ .................................................. H02K 3/00
[52] U.S. Cl. ........................ 310/180; 310/68 B; 310/111; 310/184; 310/198; 324/207.25
[58] Field of Search ............................. 310/180, 184, 310/208, 207, 68 B, 111, 168, 198; 324/207.16, 207.25; 336/120; 20/596

[56] References Cited

U.S. PATENT DOCUMENTS

| | | |
|---|---|---|
| 4,492,280 | 1/1985 | MacDonald . |
| 4,659,953 | 4/1987 | Luneau ................................... 310/111 |
| 5,124,604 | 6/1992 | Swartz ................................... 310/68 B |
| 5,177,393 | 1/1993 | Webber ................................... 310/68 B |
| 5,329,195 | 7/1994 | Horber ................................... 310/68 B |
| 5,341,076 | 8/1994 | Bahn ................................... 310/68 B |
| 5,355,041 | 10/1994 | Shirao ................................... 324/207.16 |

FOREIGN PATENT DOCUMENTS 0449298 10/1991 European Pat. Off. .
966576 8/1964 United Kingdom .

OTHER PUBLICATIONS

AIEE Appl. and Ind. pp. 421–426 Jan. 1956 "Design of High–precision Synchros and Resolvers".
AIEE Dec. 1954 pp. 1416–1419 "Space Harmonics Generated by Concentric Windings".

Primary Examiner—R. Skudy
Attorney, Agent, or Firm—Brooks Haidt Haffner & Delahunty

[57] ABSTRACT

A sinusoidally distributed winding method suitable for a detector winding comprises the steps of serially connecting winding groups (x) wound sequentially at one-slot intervals to form a one-phase shunt winding group (y), and constructing an n-phase shunt winding group (Z) using n of the one-phase shunt winding groups (y). An automatic winding can be performed based on the winding procedure group wound sequentially at one-slot pitch intervals.

1 Claim, 10 Drawing Sheets

(1-PHASE WINDING)

SYNCHRO=3-PHASE WINDING

RESOLVER = 2-PHASE
WINDING   OR 4-PHASE

N-PHASE WINDING (WINDING ARRANGEMENT)

SINUSOIDALLY DISTRIBUTED WINDING METHOD SUITABLE FOR A DETECTOR WINDING

BACKGROUND OF THE INVENTION

1. Field of the Invention

The present invention relates to a sinusoidally distributed winding method suitable for a detector winding, and more particularly to a novel improvement thereof where a one-phase shunt winding group is formed by serially connecting winding groups which are wound sequentially at one-slot pitch intervals, and a 2P polar and n-phase sinusoidally distributed magnetic flux is obtained by the shunt-winding of the one-phase winding group by n-phases, whereby a winding can be performed using an automatic winding machine.

2. Description of the Related Art

Conventionally, the methods shown in FIGS. 1 through 5 have been generally used as a sinusoidally distributed winding method adapted for sensor windings such as resolvers, synchros, and the like. That is, in FIGS. 3 and 4, numeral 20 represents a stator formed in a cylindrical shape as a whole. A plurality of slots 30 are formed inside the stator 20. In the slot Nos. 1 to 16, one-phase first stator windings 21, each formed previously in a ring shape, are arranged between the slots 4 and 6, 3 and 7, 2 and 8, 1 and 9, 1 and 9, 16 and 10, 15 and 11, and 14 and 12. A rotor receiving hole 22 is formed inside each of the slots 30 by spreading in the direction of the arrow B after mounting the first stator winding 21.

Among the slots 30, second stator windings 23, each formed in a ring shape, are arranged between the slots Nos. 2 and 16, 3 and 15, 4 and 14, 5 and 13, 5 and 13, 6 and 12, 7 and 11, and 8 and 10 so as to be perpendicular to the first stator winding 21. As shown in FIG. 3 and 4, the stator windings 21 and 23 are arranged respectively in the slots 30 of a stator 20 by spreading in the direction of the arrow A after arranging the second stator winding 23. A rotor having a rotor winding (not shown) is arranged rotatably within the rotor receiving hole 22. The stator windings 21 and 23, as shown in FIGS. 1 and 2, are arranged to form a resolver, e.g., as shown in FIG. 9, where the winding at each slot 30 produces a sine or cosine phase (2-phase) sinusoidally distributed magnetic flux.

Therefore, for example, when a fixed ac voltage is applied to the rotor winding in the above-mentioned state, electromagnetic induction produces a voltage due to an interlinkage magnetic flux between the stator windings 21 and 23, thus producing a rotation detection signal.

However, the aforedescribed conventional sinusoidally distributed winding method for a detector winding has the following disadvantage.

In the prior art method, windings in a ring shape are inserted previously within each of the slots by jumping over the adjoining slots and then the windings are spread to arrange them in the respective slots. Therefore, it is impossible to carry out winding by means of an automatic wiring machine. Since all winding procedures are performed manually, it has been impossible to achieve improved production efficiency and cost reduction.

SUMMARY OF THE INVENTION

The present invention overcomes the above mentioned problem. Particularly, an object of the present invention is to provide a method of forming a sinusoidally distributed winding for a detector where a one-phase winding group is constructed by serially connecting winding groups which are wound sequentially at one-slot pitch intervals whereby a 2P polar and n-phase sinusoides magnetic flux is obtained by winding groups to n-phase and can be formed using an automatic winding machine.

According to the present invention, in a sinusoidally distributed winding method for a detector winding where n-phase winding groups are wound on a ring core which has a given number (S) of tooth portions and slots on its inner diameter side so that a one-phase winding group of said n-phase winding groups produces a 2P polar and sinusoidally distributed magnetic flux distribution, the improvement comprises the step of directly connecting winding groups of the number (S) corresponding to the number of the slots, to construct each one-phase winding group, the winding groups being wound at one-slot pitch intervals, and using a plurality of the one-phase winding groups to construct the n-phase winding groups, whereby a 2P polar and n-phase sinusoidally distributed magnetic flux is provided.

In detail, the number of windings for each of the slots of the one-phase winding group is obtained from the Formula (1).

$$\left. \begin{array}{l} N_{k1} = \dfrac{W \sin\left[ 2\pi P/S \left\{ (k-1) + \dfrac{1}{2} \right\} \right]}{\sum\limits_{i=1}^{S} \sin\left[ 2\pi P/S \left\{ (i-1) + \dfrac{1}{2} \right\} \right]} \\[2em] N_{k2} = \dfrac{W \sin\left[ 2\pi P/S \left\{ (k-1) + \dfrac{1}{2} \right\} + \dfrac{2\pi}{n} \right]}{\sum\limits_{i=1}^{S} \sin\left[ 2\pi P/S \left\{ (i-1) + \dfrac{1}{2} \right\} + \dfrac{2\pi}{n} \right]} \\[2em] \vdots \\[1em] N_{k(n)} = \dfrac{W \sin\left[ 2\pi P/S \left\{ (k-1) + \dfrac{1}{2} \right\} + \dfrac{2\pi(n-1)}{n} \right]}{\sum\limits_{i=1}^{S} \sin\left[ 2\pi P/S \left\{ (i-1) + \dfrac{1}{2} \right\} + \dfrac{2\pi(n-1)}{n} \right]} \end{array} \right\} \quad \text{Formula (1)}$$

where $N_{k(n)}$ is the number of turns of the winding portion at the k-th slot, where k is an integer between 1 and S in the (n)-th winding group in the n-phase, where i is a counter for the summation;

W is the total number of turns (the sum of the windings wound at each slot of i=1 to S in each one-phase); and S is the number of slots.

In detail, in the n-phase winding groups, a resolver is formed in the sine phase winding and the cosine phase winding, which are arranged alternately in the inner side and the outer side of each of the slots.

In more detail, the n-phase winding group is wound by way of a guide pin which is arranged at an outer position of each of the slots in the ring core.

In still further detail, an insulating member with a guide pin is arranged at each of the slots in the ring core, and the n-phase winding group is wound through the guide pin.

In the sinusoidally distributed winding method for a detector winding according to the present invention, S winding groups corresponding to a predetermined number S of slots are obtained by forming sequentially winding in the ring core at one-slot intervals, while an automatic winding can be carried out using a winding machine to form the one-phase winding group by serially connecting each of the winding groups. An N-phase sinusoidally distributed magnetic flux can be obtained by winding one-phase winding group by n phases.

The above and other objects, features and advantages of the present invention will be apparent from the following description when is read in conjunction with the accompanying drawings.

DESCRIPTION OF THE PREFERRED EMBODIMENT

Referring to attached drawings, an explanation will be made in detail as for a preferred embodiment of a sinusoidally distributed winding method for a detector winding according to the present invention. The same or similar portions as those in the prior art will be explained by denoting the same numerals. FIGS. 6 through 17 show a sinusoidally distributed winding method adopted for a detector winding according to the present invention.

Figure 6:
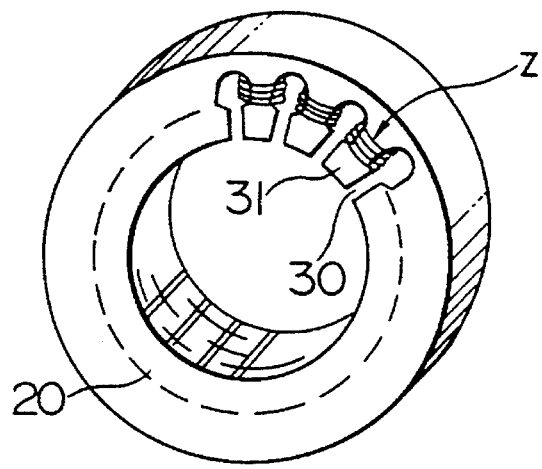
FIG. 6 is a perspective view showing a ring core using a detecor winding according to the present invention.
Figure 7:
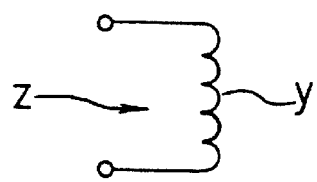
FIG. 7 is a structural diagram showing a one-phase or a two-phase winding.
Figure 8:
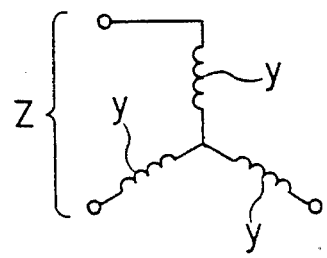
FIG. 8 is a structural view showing a three-phase winding which is called a synchro winding.
Figure 9:
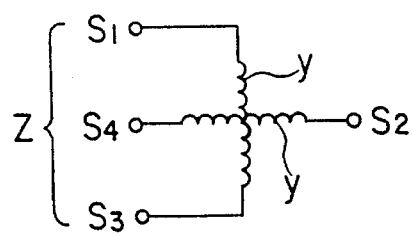
FIG. 9 is a structural diagram showing a 4-phase or an irregular two-phase winding which is called a resolver winding.
Figure 10:
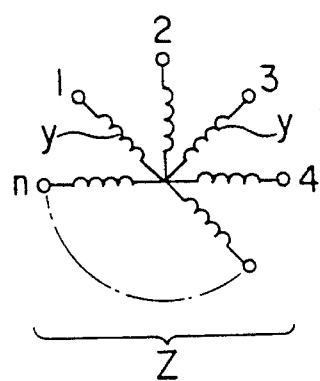
FIG. 10 is a structural diagram showing an n-phase winding.

Referring to FIG. 6, numeral 20 represents a ring core as a stator which has a given number S of slots 30 and teeth 31 opened inside the inner diameter and is formed by laminating a large number of core elements. In the the winding group Z arranged in each of a slots 30, FIG. 7 shows a two-phase or a winding, FIG. 8 shows a winding (synchro), FIG. 9 shows a 4-phase winding (or an irregular 2-phase resolver), and FIG. 10 shows an n-phase winding.

Figure 11:
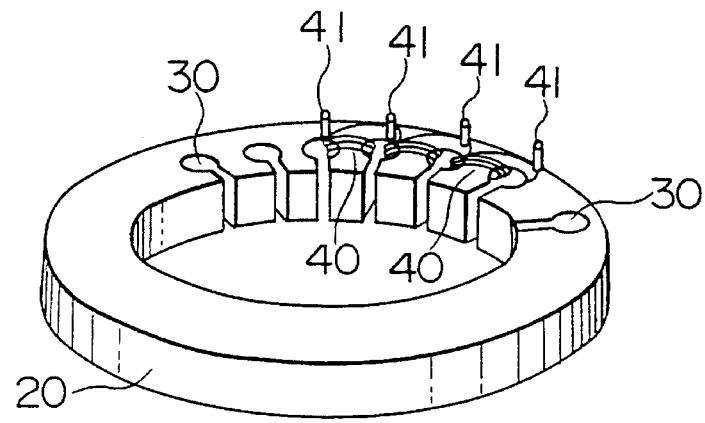
FIG. 11 is a perspective view showing another embodiment of the winding shown in FIG. 6.

In FIG. 11, guide pins 41 are planted at the outer positions of each of said slots 30 in said ring core 20 and an n-phase winding group Z is wound via the guide pin 41.

Figure 12:
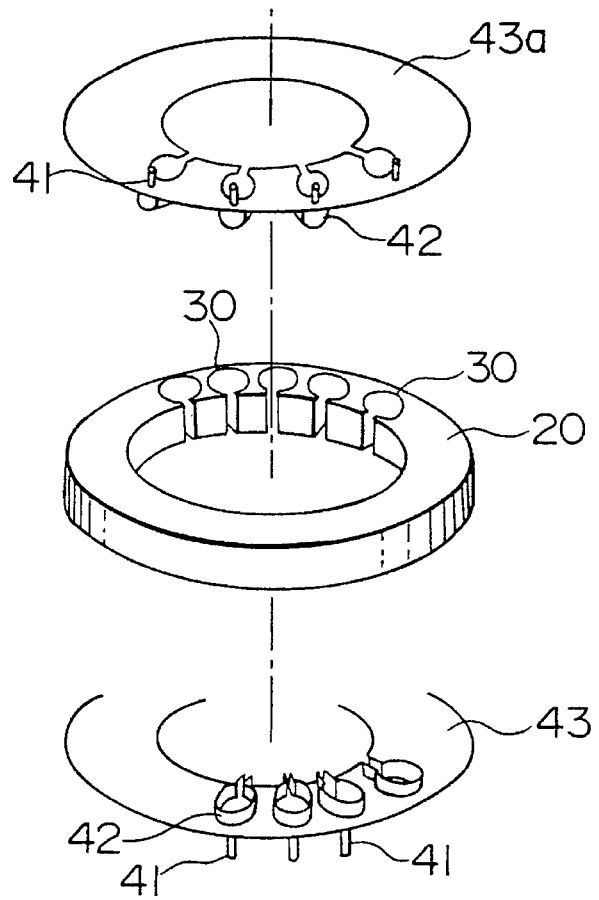
FIG. 12 is a disassembled perspective view showing another embodiment of the winding shown in FIG. 11.

In the method shown in FIG. 12, a pair of ring insulating members 43 and 43a, which are formed integrally with a slit insulating portion 42 within each of the slots 30, are fitted on both ends of the ring core 20. The ring insulating members 43 and 43a have their slit insulating portions formed integrally with a guide pin 41 and an n-phase winding group Z is wound via the guide pin 41.

Figure 13:
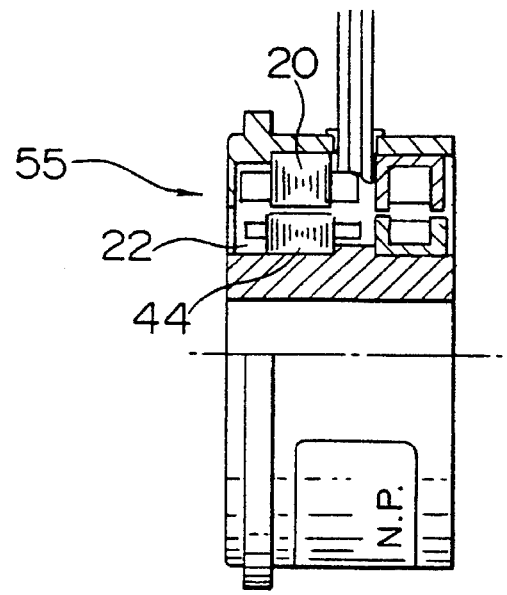
FIG. 13 is a cross sectional view of a resolver.
Figure 14:
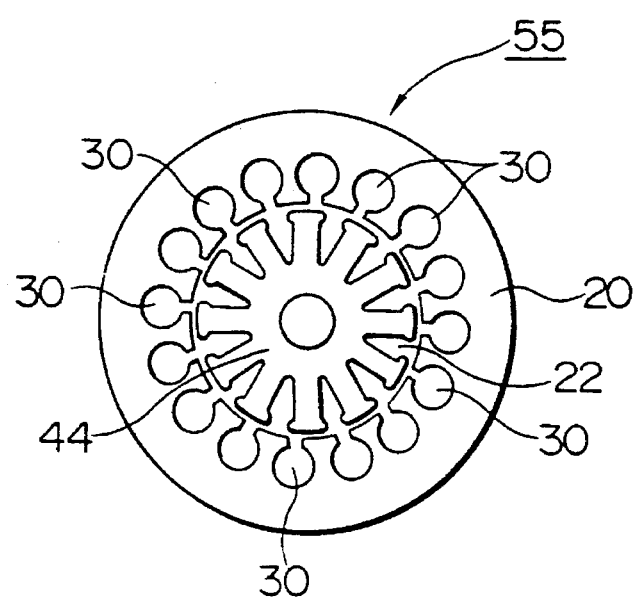
FIG. 14 is a side view of a resolver.

In FIGS. 13 and 14, a stator is constructed using the above-mentioned ring core 20 and a rotor 44 is arranged rotatably within the rotor guide hole 22 which is formed in the center of the ring core 20. A resolver 55 comprises the ring core 20 and the rotor 44. The ring core 20 should be limited to a stator but may be applicable for the rotor.

Further, the sinusoidally distributed winding method for a detector winding according to the present invention will be explained below.

Figure 15:
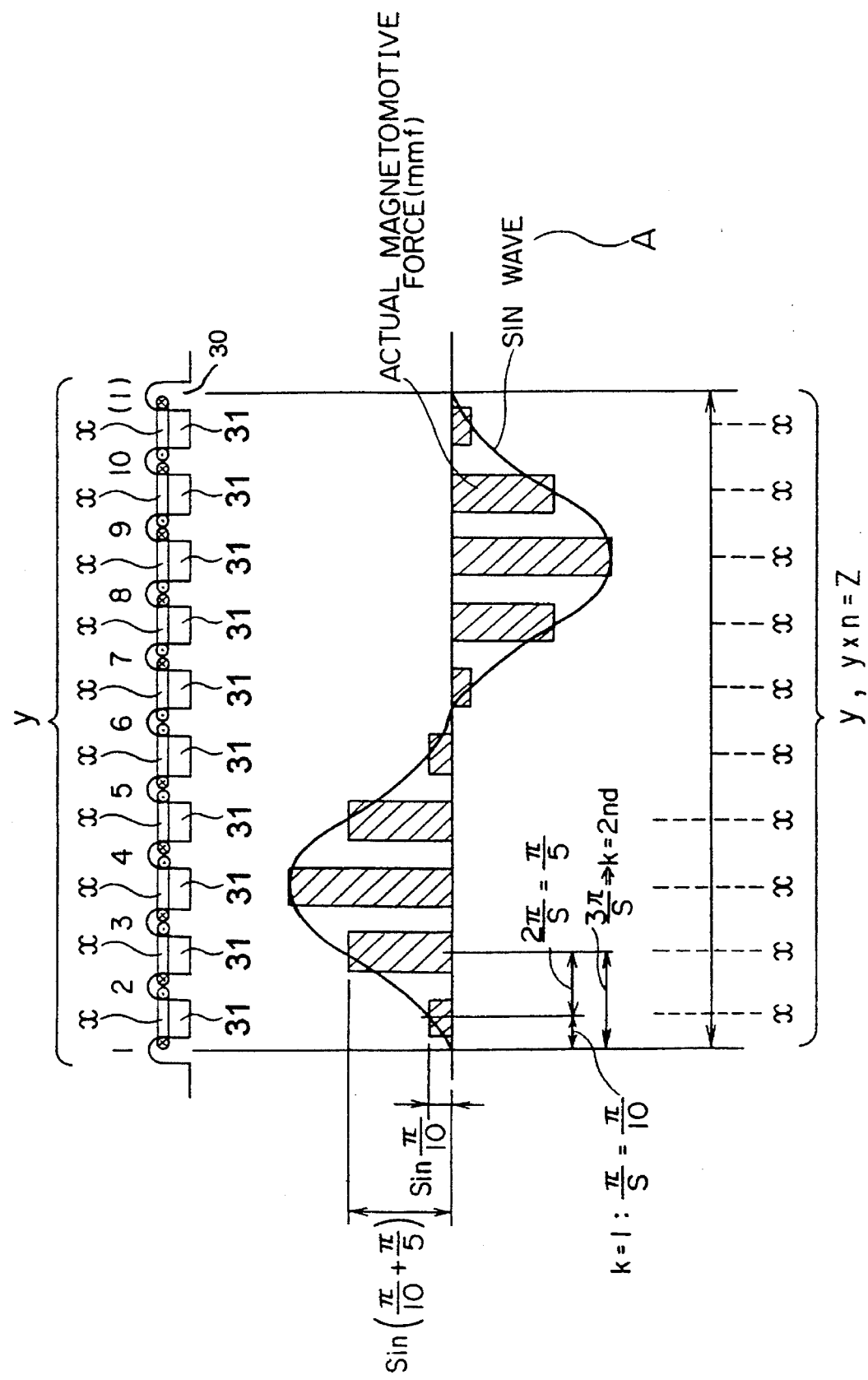
FIG. 15 is a structural diagram showing a one-phase winding group and sinusoidally distributed amplitude.

For example, as shown in FIG. 15, the ring core 20 has 10 slots 30 (or S=10) and 10 teeth 31, and a 2P polar resolver with a single pole and P poles has a one-phase shunt winding group y. In this case, the windings 40 are wound sequentially at one slot pitch intervals; S winding groups x (or S=10) for each slot 30 are connected serially; a one-phase shunt winding group y is formed of the 10 winding groups x; and finally an n-phase shunt winding group Z is formed by combining n of said one-phase shunt groups y.

Therefore, shown in FIG. 15, the n-phase shunt winding group Z produces, in the entire angle of $2\pi$ radians of the ring core 20, a pulse magnetomotive force (like a bar graph) for each of the respective winding groups x (having a different winding number) in each slot 30. A sine wave magnetic flux A is formed by the envelope of these magnetomotive forces.

Figure 16:
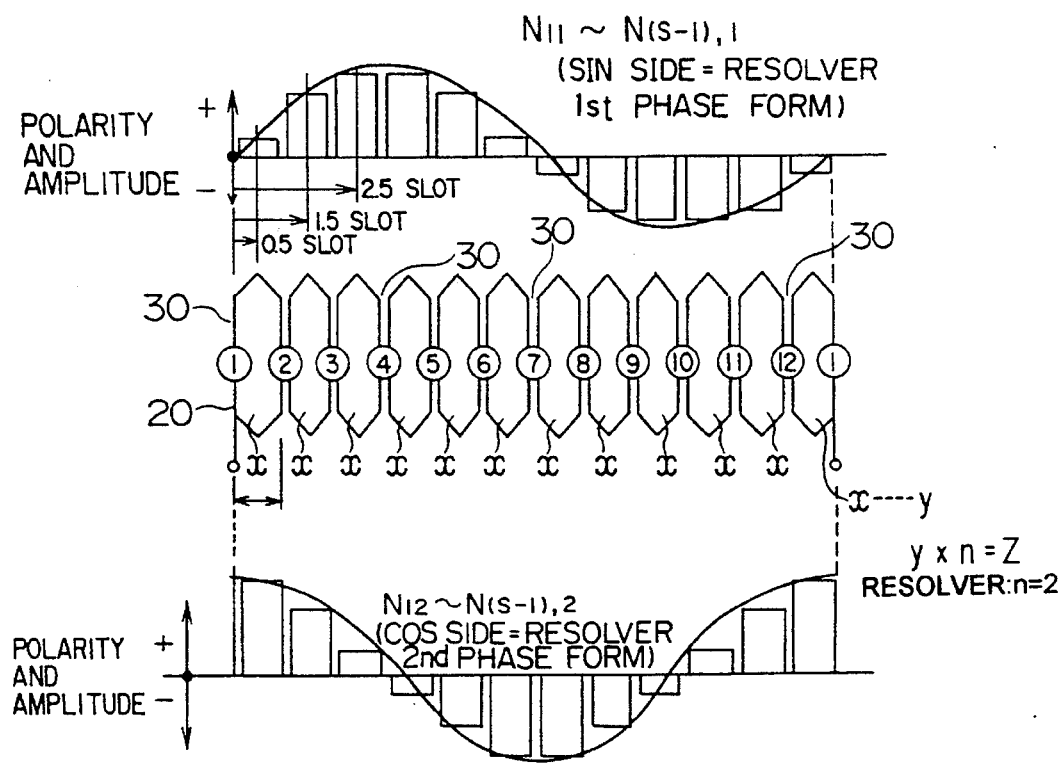
FIG. 16 is a structural diagram showing another embodiment of one-phase shunt winding group and sinusoidally distributed amplitude.

In the case of 12 slots (or S=12) as shown in FIG. 16, a one-phase shunt winding group y, which is obtained by connecting serially 12 winding groups x, is formed by utilizing the same winding method as the above-mentioned one. The magnetic flux distribution at the sine side and the cosine side can be obtained by using a 1st-phase shunt winding group Z employing n 2nd-phase shunt winding groups.

One-phase shunt winding group y is formed by connecting serially the winding groups x, respectively. The n-phase shunt winding group Z, which is formed by winding the one-phase winding group y by n-phases, is expressed by the following general formula (1).

$$N_{k1} = \frac{W\sin\left[\ 2\pi P/S\ \left\{\ (k-1)+\frac{1}{2}\ \right\}\ \right]}{\sum_{i=1}^{S} \sin\left[\ 2\pi P/S\ \left\{\ (i-1)+\frac{1}{2}\ \right\}\ \right]}$$

$$N_{k2} = \frac{W\sin\left[\ 2\pi P/S\ \left\{\ (k-1)+\frac{1}{2}\ \right\}+\frac{2\pi}{n}\ \right]}{\sum_{i=1}^{S} \sin\left[\ 2\pi P/S\ \left\{\ (i-1)+\frac{1}{2}\ \right\}+\frac{2\pi}{n}\ \right]}$$

.
.
.

$$N_{k(n)} = \frac{W\sin\left[\ 2\pi P/S\ \left\{\ (k-1)+\frac{1}{2}\ \right\}+\frac{2\pi(n-1)}{n}\ \right]}{\sum_{i=1}^{S} \sin\left[\ 2\pi P/S\ \left\{\ (i-1)+\frac{1}{2}\ \right\}+\frac{2\pi(n-1)}{n}\ \right]}$$

Formula (1)

where $N_{k(n)}$ is the number of turns of the winding portion at the k-th slot, where k is an integer between 1 and S, in the (n)-th winding group in the n-phase, where i is a counter for the summation;

W is the total number of turns (the sum of the windings wound at each slot of i=1 through S in one-phase); and S is the number of slots.

Among the slots 30, being S in number, the k-th winding number from the first slot to the (S)th slot is shown and various formulas for $N_{k1}$ to $N_{k(n)}$ are applied with respect to slots 30 in FIGS. 15 and 16.

The formula (1) is a general one for an n-phase winding, and, for example, should not be limited to a resolver. In the case of a resolver, when n=4, an irregular 2-phase is provided.

$$N_{k1} = \frac{W\sin\left[\ 2\pi P/S\ \left\{\ (k-1)+\frac{1}{2}\ \right\}\ \right]}{\sum_{i=1}^{S} \sin\left[\ 2\pi P/S\ \left\{\ (i-1)+\frac{1}{2}\ \right\}\ \right]}$$

Formula (2)

A sine side (1st-phase) winding is shown and has coils of S in number.

$$N_{k2} = \frac{W\sin\left[\ 2\pi P/S\ \left\{\ (k-1)+\frac{1}{2}\ \right\}+\frac{\pi}{2}\ \right]}{\sum_{i=1}^{S} \sin\left[\ 2\pi P/S\ \left\{\ (i-1)+\frac{1}{2}\ \right\}+\frac{\pi}{2}\ \right]}$$

Formula (3)

A cosine side (2nd-phase) is shown and has coils of S in number.

That is, one-phase shunt winding group y, being a 1st-phase winding at the sine side, is formed in accordance with the formula (2). One-phase shunt winding group y, being a 2nd-phase winding at the cosine side, is formed in accordance with the formula (3). The n-phase shunt winding group Z comprises windings x and y. In this case, an explanation is omitted because the third-phase winding is the same as the first one while the fourth-phase winding is the same as the second one.

The winding group x (the number of the slots 30 are S) is represented by the formula (4) by resolving 1st-phase shunt windings at the sine side expressed by the formula (2) into each of the slots 30.

$$N_{11(x)} = \frac{W\sin\left(\frac{\pi P}{S}\right)}{\sum_{i=1}^{S} \sin\left[\ \frac{2\pi P}{S}\ \left\{\ (i-1)+\frac{1}{2}\ \right\}\ \right]}$$

$$N_{21(x)} = \frac{W\sin\left(\frac{2\pi P}{S} \times \frac{3}{2}\right)}{\sum_{i=1}^{S} \sin\left[\ \frac{2\pi P}{S}\ \left\{\ (i-1)+\frac{1}{2}\ \right\}\ \right]}$$

$$N_{k1(x)} = \frac{W\sin\left[\ 2\pi P/S\ \left\{\ (k-1)+\frac{1}{2}\ \right\}\ \right]}{\sum_{i=1}^{S} \sin\left[\ \frac{2\pi P}{S}\ \left\{\ (i-1)+\frac{1}{2}\ \right\}\ \right]}$$

.
.
.

$$N_{(s)1(x)} = \frac{W\sin\left[\ 2\pi \frac{P}{S}\ \left\{\ (S-1)+\frac{1}{2}\ \right\}\ \right]}{\sum_{i=1}^{S} \sin\left[\ \frac{2\pi P}{S}\ \left\{\ (i-1)+\frac{1}{2}\ \right\}\ \right]}$$

Formula (4)

Subscripts show the number of turns of each of said winding groups x.

Next, $N_{k2}$ in the formula (3) is represented by the formula (5) by resolving a 2nd-phase winding group y at cosine the side at every slot 30.

$$N_{12} = \frac{W\sin\left(\frac{\pi P}{S} + \frac{\pi}{2}\right)}{\sum_{i=1}^{S} \sin\left[\ \frac{2\pi P}{S}\ (i-1)+\frac{1}{2}+\frac{\pi}{2}\ \right]}$$

$$N_{22} = \frac{W\sin\left(\frac{2\pi P}{S} \times \frac{3}{2} + \frac{\pi}{2}\right)}{\sum_{i=1}^{S} \sin\left[\ \frac{2\pi P}{S}\ \left\{\ (i-1)+\frac{1}{2}\ \right\}+\frac{\pi}{2}\ \right]}$$

$$N_{k2} = \frac{W\sin\left[\ \frac{2\pi P}{S}\ \left\{\ (k-1)+\frac{1}{2}\ \right\}+\frac{\pi}{2}\ \right]}{\sum_{i=1}^{S} \sin\left[\ \frac{2\pi P}{S}\ \left\{\ (i-1)+\frac{1}{2}\ \right\}+\frac{\pi}{2}\ \right]}$$

$$N_{(s)\cdot 1} = \frac{W\sin\left[\ \frac{2\pi P}{S}\ \left\{\ (S-1)+\frac{1}{2}\ \right\}+\frac{\pi}{2}\ \right]}{\sum_{i=1}^{S} \sin\left[\ \frac{2\pi P}{S}\ \left\{\ (i-1)+\frac{1}{2}\ \right\}+\frac{\pi}{2}\ \right]}$$

Formula (5)

Subscripts show the number of turns of the winding for each of said wiring groups x. That is, $N_{k2}$ in the formula (3) is the number of the winding in the respective slot 30.

Figure 17:
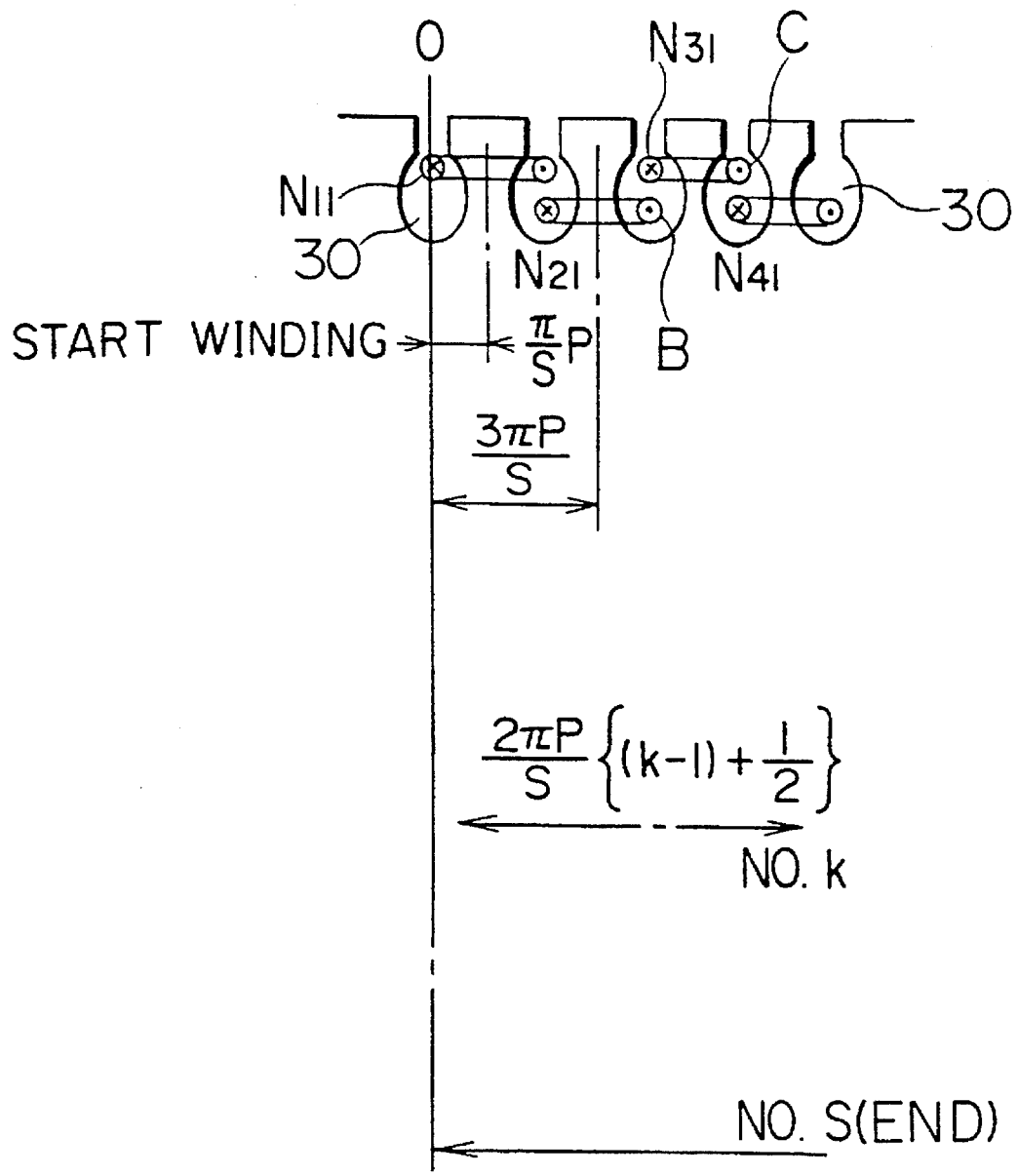
FIG. 17 is a structural diagram showing a winding group in each of a plurality of slots.

As shown in FIG. 17, the windings $N_{11}$, $N_{21}$, $N_{31}$, and $N_{41}$ in the winding group x, shown by the formulas (4) and (5), are arranged at the inner sides B and the outer sides C in the slots 30, respectively.

Figure 1:
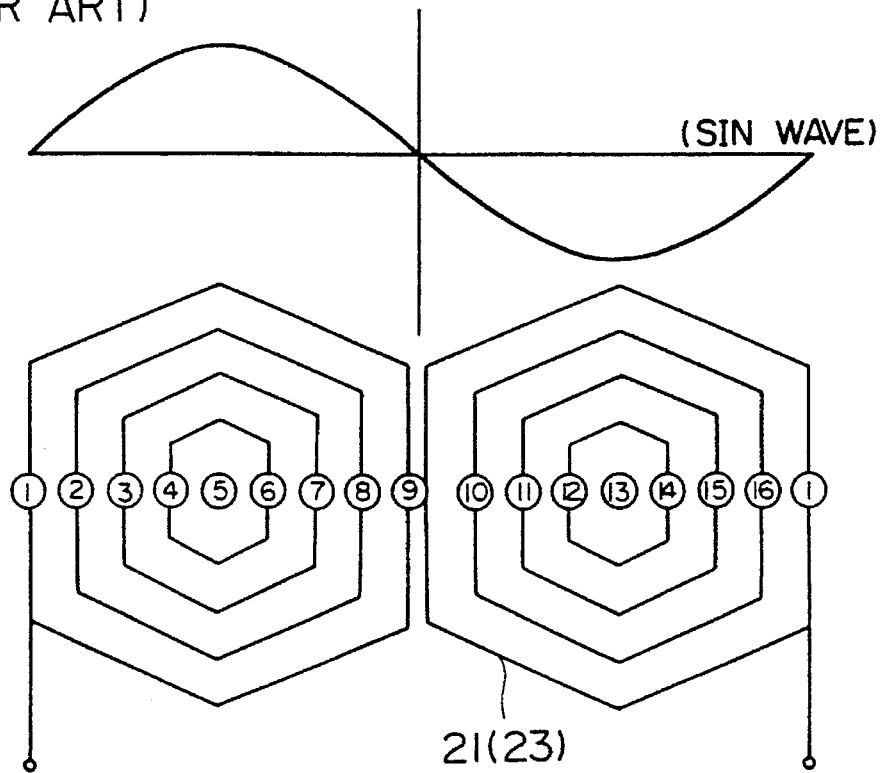
FIG. 1 is a structural diagram showing a conventional winding method.
Figure 2:
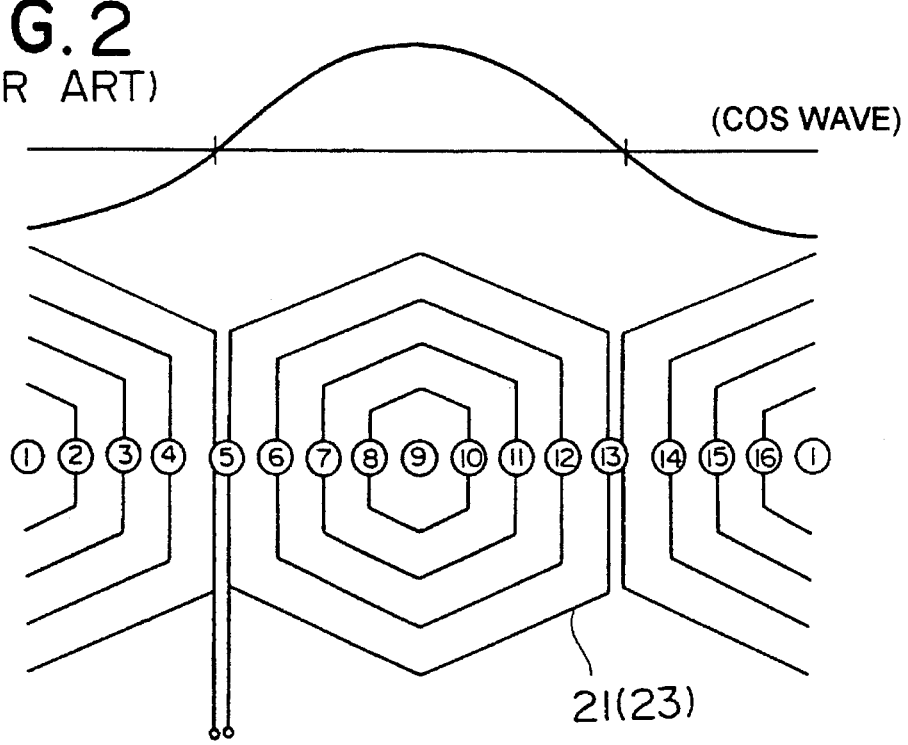
FIG. 2 is a structural diagram showing another conventional winding method.
Figure 3:
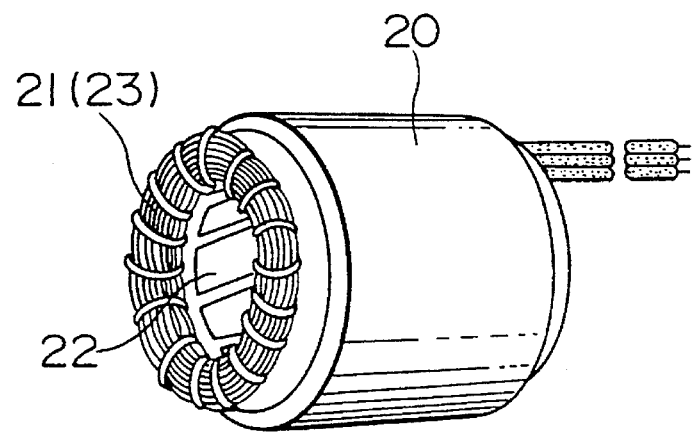
FIG. 3 is a perspective view showing a conventional resolver.
Figure 4:
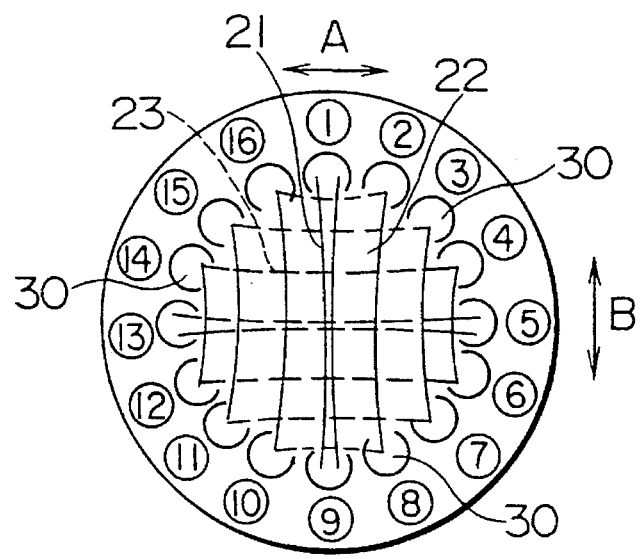
FIG. 4 is a structural diagram showing a conventional winding.
Figure 5:
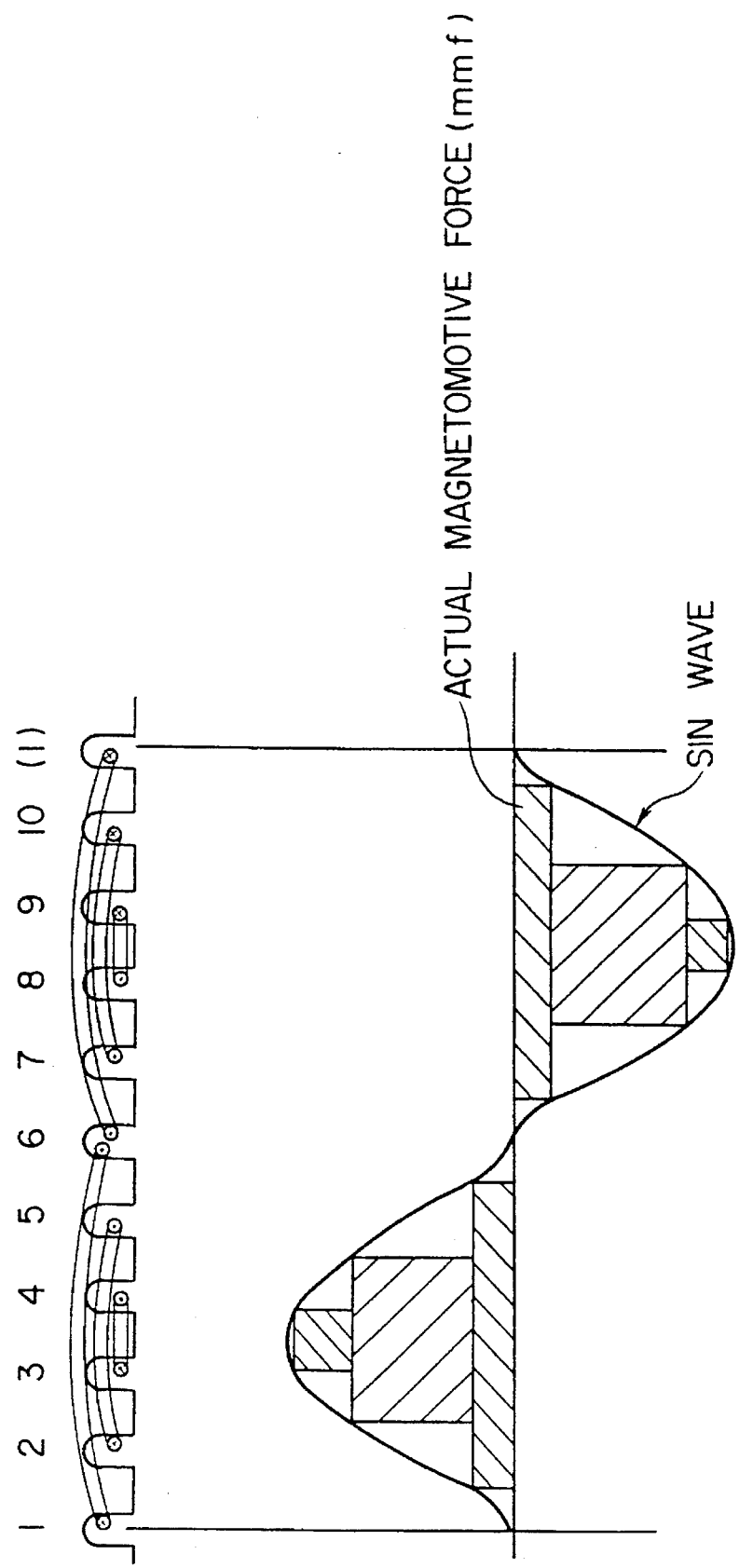
FIG. 5 is a structural diagram showing conventional windings and sine wave distribution.

The winding groups x in the slots 30 at the sine side (represented by the formula (4)) and the cosine side (represented by the formula (5)) in the above-mentioned one-phase winding group y are arranged as shown in Table 1, respectively. In Table 1, symbols S1 to S4 correspond to the terminals S1 to S4 in FIG. 4, respectively.

TABLE 1

| Slot | S1(start) ↓ sine side | S2(start) ↓ cosine side | * ↓ sine side |
|---|---|---|---|
| 1 | (1) inner side B ($N_{1\cdot1}$) | (9) outer side C ($N_{1\cdot2}$) | |
| 2 | | (10) inner side B ($N_{2\cdot2}$) | (25) outer side C ($N_{2\cdot1}$) |
| 3 | (2) inner side B ($N_{3\cdot1}$) | (11) outer side C ($N_{3\cdot2}$) | |
| 4 | | (12) inner side B ($N_{4\cdot2}$) | (26) outside side C ($N_{4\cdot1}$) |
| 5 | (3) inner side B (N5.1) | (13) outer side C ($N_{5\cdot2}$) | |
| 6 | | (14) inner side B ($N_{6\cdot2}$) | (27) outer side C ($N_{6\cdot1}$) |
| 7 | (4) inner side B ($N_{7\cdot1}$) | (15) outer side C ($N_{7\cdot2}$) | |
| 8 | | (16) inner side B ($N_{8\cdot2}$) | (28) outer side C ($N_{8\cdot1}$) |
| 9 | (5) inner side B ($N_{9\cdot1}$) | (17) outer side C ($N_{9\cdot2}$) | |
| 10 | | (18) inner side B ($N_{10\cdot2}$) | (29) outer side C ($N_{10\cdot1}$) |
| 11 | (6) inner side B ($N_{11\cdot1}$) | (19) outer side C ($N_{11\cdot2}$) | |
| 12 | | (20) inner side B ($N_{12\cdot2}$) | (30) outer side C ($N_{12\cdot1}$) |
| 13 | (7) inner side B ($N_{13\cdot1}$) | (21) outer side C ($N_{13\cdot2}$) | |
| 14 | | (22) inner side B ($N_{14\cdot2}$) | (31) outer side C ($N_{14\cdot1}$) |
| 15 | (8) inner side B ($N_{15\cdot1}$) | (23) outer side C ($N_{15\cdot2}$) | |
| 16 | | (24) inner side B ($N_{16\cdot2}$) | (32) outer side C ($N_{16\cdot1}$) |
| | ↓ | ↓ | ↓ |
| Slot 30 | * | S4(END) | S3(END) |

Symbol * represents a short condition.
S1 to S4 represent terminals.
(1)~(32) show a winding order.

Therefore, as shown Table 1, the winding groups x are arranged alternately along the inner sides B and the outer sides C of the slots 30, as shown in FIG. 17.

Since the sinusoidally distributed winding method for a detector winding according to the present invention is carried out as described above, it is possible to provide a winding at every one-slot intervals. A winding has not ever been able to be performed using an automatic winding machine. But the present invention enables automatic winding, thus leading to large cost reduction.

Further, since the number of winding turns at each winding portion can be easily calculated using the formula (1), the sinusoidally distributed magnetic flux decomposition distribution can be obtained accurately, whereby the accuracy of a rotation analog signal which is obtained by a resolver or the like can be improved greatly.

Further, it is possible to provide better uniformity in the winding at a sine and cosine side in said slots whereby a stable and precise detector is obtained.

Still other variations and modifications are possible within the scope of the present invention which is limited solely by the appended claims.

What is claimed is:

1. In a sinusoidally distributed winding suitable for a detector winding wherein n-phase winding groups are wound on a ring core having a given number of alternating tooth portions and slots disposed along its inner diameter side so that a plurality of one-phase winding groups produce a 2P polar and sinusoidally distributed magnetic flux distribution of said n-phase winding groups, the improvement comprising a number of serially connected winding groups corresponding to the number of said slots to provide said plurality of one-phase winding groups, said winding groups being wound at one-slot pitch intervals, and a plurality of said one-phase winding groups providing said n-phase winding groups, whereby a 2P polar and n-phase sinusoidally distributed magnetic flux is provided, a number of winding turns of said one-phase winding groups in each of said slots being determined by the following formula:

$$N_{k1} = \frac{W\sin\left[2\pi P/S\left\{(k-1)+\frac{1}{2}\right\}\right]}{\sum_{i=1}^{S}\sin\left[2\pi P/S\left\{(i-1)+\frac{1}{2}\right\}\right]}$$

$$N_{k2} = \frac{W\sin\left[2\pi P/S\left\{(k-1)+\frac{1}{2}\right\}+\frac{2\pi}{n}\right]}{\sum_{i=1}^{S}\sin\left[2\pi P/S\left\{(i-1)+\frac{1}{2}\right\}+\frac{2\pi}{n}\right]}$$

$$N_{k(n)} = \frac{W\sin\left[2\pi P/S\left\{(k-1)+\frac{1}{2}\right\}+\frac{2\pi(n-1)}{n}\right]}{\sum_{i=1}^{S}\sin\left[2\pi P/S\left\{(i-1)+\frac{1}{2}\right\}+\frac{2\pi(n-1)}{n}\right]}$$

where
S is a variable integer representing said number of slots;
k is a variable integer representing a given slot, k being between one and said number of slots;
n is a variable integer representing a number of phases;
P is a variable integer representing a number of magnetic poles in said detector winding;
W is a variable integer representing a total number of turns (the sum of the windings wound at each slot in one phase when i=1 to S); and
$N_{k\ (n)}$ is a variable integer representing the respective number of turns of the windings at the k-th slot in the n-th winding group of said n-phase winding groups.

* * * * *

UNITED STATES PATENT AND TRADEMARK OFFICE
CERTIFICATE OF CORRECTION

PATENT NO. : 5,486,731
DATED : January 23, 1996
INVENTOR(S) : Masaki et al

It is certified that error appears in the above-indentified patent and that said Letters Patent is hereby corrected as shown below:

Column 2, line 3, after "intervals" insert comma --,--;
  line 4, "sinusoides" should read --sinusoidal--;
  line 15, after "(S)" insert a comma --,--.

Column 4, line 5, before "winding" delete "the" (both occurrences), insert --a one-phase--; line 6, before "slots" change "a" to --the--; line 7, before "winding," (first occurrence) insert --one-phase--; after "shows a" insert --3-phase--;
  line 18, after "their" insert --respective--.

Column 5, line 43 below the formula and above line 44, insert --(sine side)--.

Column 6, line 29, after "at" insert --the--; after "cosine" delete "the".

Column 7, line 11 "outside" should read --outer--.

Signed and Sealed this

Sixteenth Day of July, 1996

Attest:

BRUCE LEHMAN

Attesting Officer

Commissioner of Patents and Trademarks